US008655071B2

(12) United States Patent
Ferman et al.

(10) Patent No.: US 8,655,071 B2
(45) Date of Patent: Feb. 18, 2014

(54) METHODS AND SYSTEMS FOR DETERMINING A DOCUMENT REGION-OF-INTEREST IN AN IMAGE

(75) Inventors: Ahmet Mufit Ferman, Vancouver, WA (US); Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 494 days.

(21) Appl. No.: 13/034,594

(22) Filed: Feb. 24, 2011

(65) Prior Publication Data

US 2012/0219222 A1 Aug. 30, 2012

(51) Int. Cl.
*G06K 9/34* (2006.01)

(52) U.S. Cl.
USPC .......................................................... 382/173

(58) Field of Classification Search
None
See application file for complete search history.

(56) References Cited

U.S. PATENT DOCUMENTS

| | | | |
|---|---|---|---|
| 6,985,631 B2 | 1/2006 | Zhang | |
| 7,499,588 B2 | 3/2009 | Jacobs et al. | |
| 8,306,336 B2* | 11/2012 | Jiang et al. | 382/219 |
| 8,437,054 B2 | 5/2013 | Campbell et al. | |
| 2003/0086018 A1* | 5/2003 | Berman et al. | 348/584 |
| 2004/0042680 A1 | 3/2004 | Saund | |
| 2005/0078192 A1 | 4/2005 | Sakurai et al. | |
| 2005/0180631 A1* | 8/2005 | Zhang et al. | 382/173 |
| 2005/0232506 A1* | 10/2005 | Smith et al. | 382/254 |
| 2006/0056710 A1* | 3/2006 | Bai et al. | 382/232 |
| 2007/0206857 A1* | 9/2007 | Campbell et al. | 382/171 |
| 2008/0069441 A1 | 3/2008 | Forutenpour | |
| 2011/0194750 A1* | 8/2011 | Nepomniachtchi | 382/137 |
| 2012/0189176 A1* | 7/2012 | Giger et al. | 382/128 |

FOREIGN PATENT DOCUMENTS

| | | | |
|---|---|---|---|
| JP | 2001228051 A | 8/2001 | |
| JP | 05/260657 A | 9/2005 | |
| JP | 06/313965 A | 11/2006 | |
| JP | 2010056827 A | 3/2010 | |

OTHER PUBLICATIONS

Japanese Office Action—Patent Application No. 2012-029899—Mailing Date: May 21, 2013.

* cited by examiner

*Primary Examiner* — Sean Motsinger
(74) *Attorney, Agent, or Firm* — Kristine Elizabeth Matthews; David C. Ripma

(57) ABSTRACT

Aspects of the present invention are related to systems and methods for identifying a document region in a non-scanned image. A first candidate document region-of-interest mask may be determined from a luminance-only image by foreground elimination, non-uniformity reduction and thresholding. A second candidate document region-of-interest mask may be formed by subtracting from the first candidate document region-of-interest mask an edge mask resulting from detecting edges in the luminance-only input image. The second candidate document region-of-interest mask may be refined, to form a final document region-of-interest mask, based on text features calculated from the luminance-only input image. The document region-of-interest may be extracted using the final document region-of-interest mask.

23 Claims, 7 Drawing Sheets

METHODS AND SYSTEMS FOR DETERMINING A DOCUMENT REGION-OF-INTEREST IN AN IMAGE

FIELD OF THE INVENTION

Embodiments of the present invention relate generally to extraction of a region-of-interest from a digital image and, in particular, to methods and systems for extracting a document region-of-interest from the digital image.

BACKGROUND

With the proliferation of digital cameras and camera-equipped mobile devices, a user may capture an image of a document, or of an object displaying document-like content, for example, a sign, a whiteboard, a poster, a projected slide and other objects displaying document-like content. The captured image may be provided as input to a traditional, document-processing workflow, for example, printing, optical character recognition (OCR), compression, archival and other document processing workflow processes. However, unlike a document image obtained using a scanner, a camera-captured document image may contain clutter with spurious content in the image background. Furthermore, a camera-captured image may suffer from artifacts related to, for example, non-uniform lighting, glare, optical distortion, perspective distortion and other artifact-generating issues. The elimination of artifacts may rely on the accurate detection and extraction of the document region, also considered the document region-of-interest, in the captured image, and subsequent processing in a document-processing workflow may yield erroneous results when the document region is not accurately determined. Therefore, methods and systems for determining a document region-of-interest in an image may be desirable.

SUMMARY

Some embodiments of the present invention comprise methods and systems for determining a document region-of-interest in an image.

According to a first aspect of the present invention, a first candidate document region-of-interest mask may be determined from a luminance-only image by foreground elimination, non-uniformity reduction and thresholding. A second candidate document region-of-interest mask may be formed by combining the first candidate document region-of-interest mask with an edge mask resulting from detection of edges in the luminance-only image. The second candidate document region-of-interest mask may be refined, to form a final document region-of-interest mask, based on text features calculated from the luminance-only image.

According to a second aspect of the present invention, a document region-of-interest may be extracted using the final document region-of-interest mask.

According to a third aspect of the present invention, the validity of the final document region-of-interest mask may be assessed based on the detected text features.

According to a fourth aspect of the present invention, the validity of the final document region-of-interest mask may be assessed based on the number of connected components in the final document region-of-interest mask.

According to a fifth aspect of the present invention, thresholding reliability may be assessed based on a contrast measure, and early termination of the document region-of-interest mask determination may be effectuated according to the contrast measure.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 2:
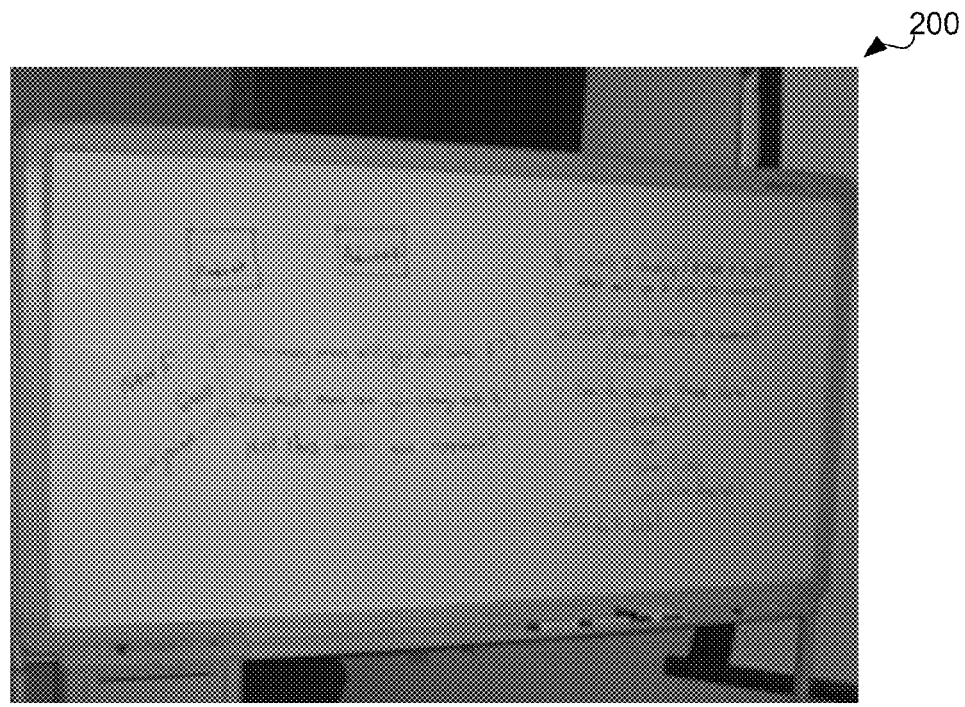
FIG. 2 depicts an exemplary down-sampled luminance image.
Figure 8:
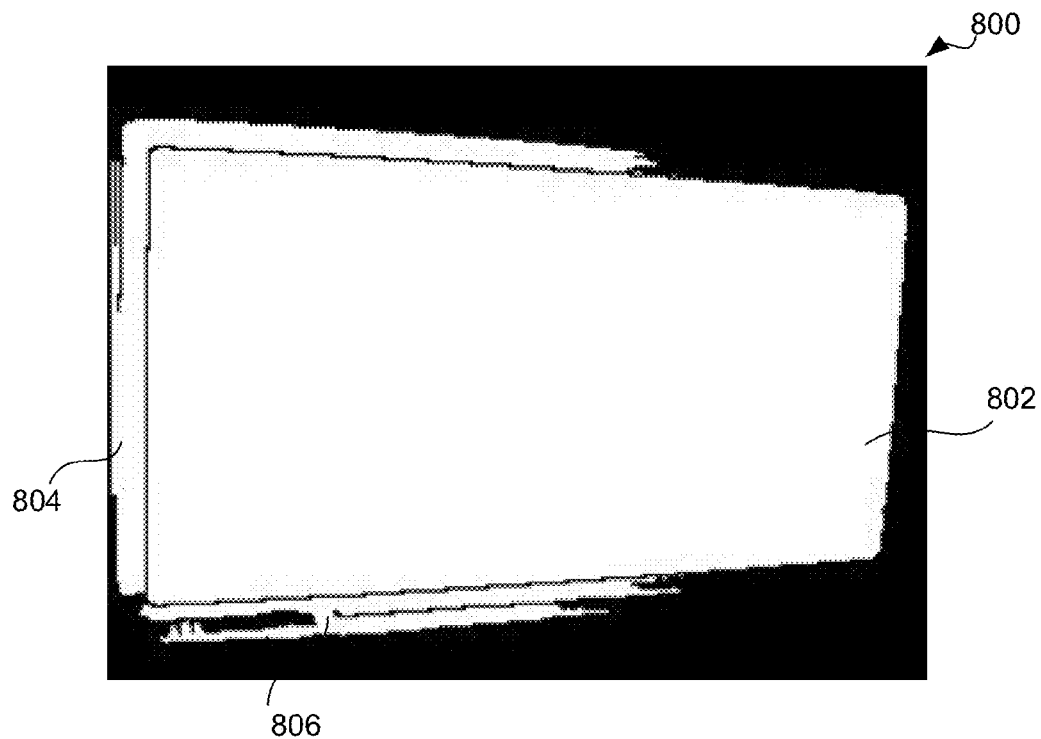
FIG. 8 depicts a second candidate document region-of-interest mask, associated with the initial candidate document region-of-interest mask shown in FIG. 6, generated according to embodiments of the present invention.
Figure 9:
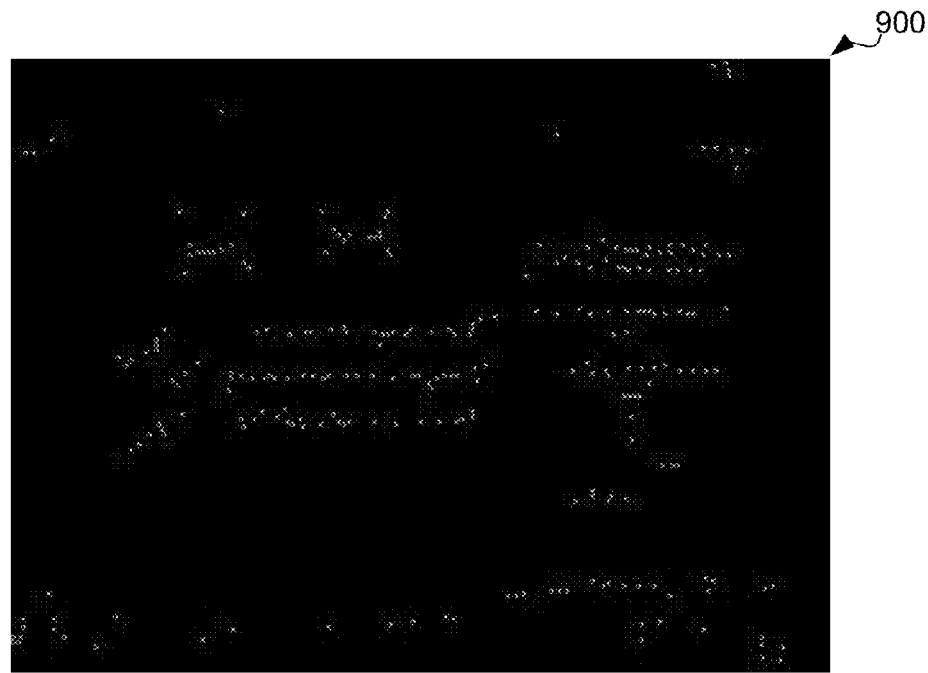
Figure 10:
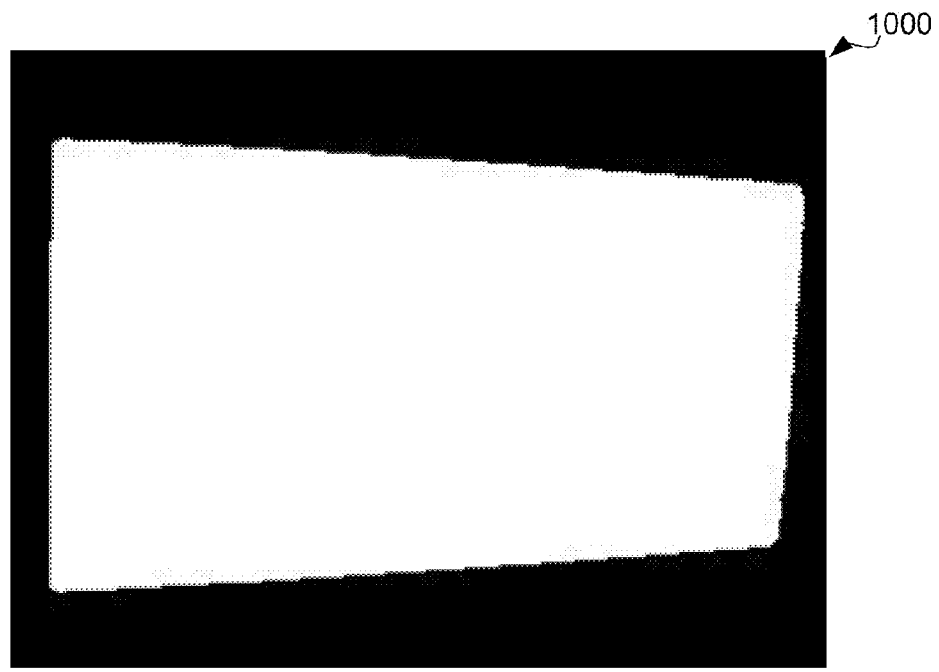
Figure 11:
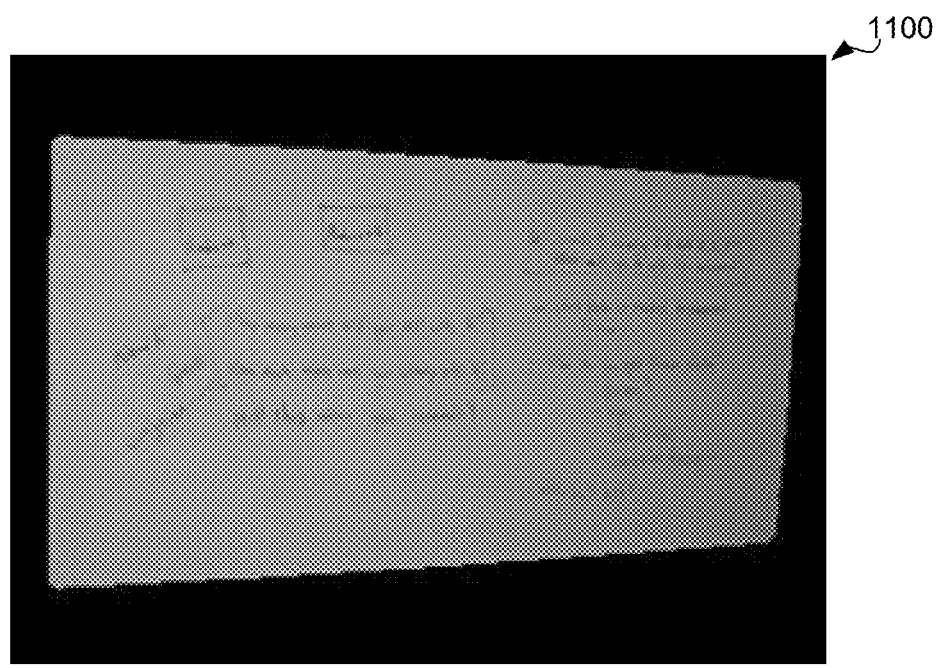
Figure 12:
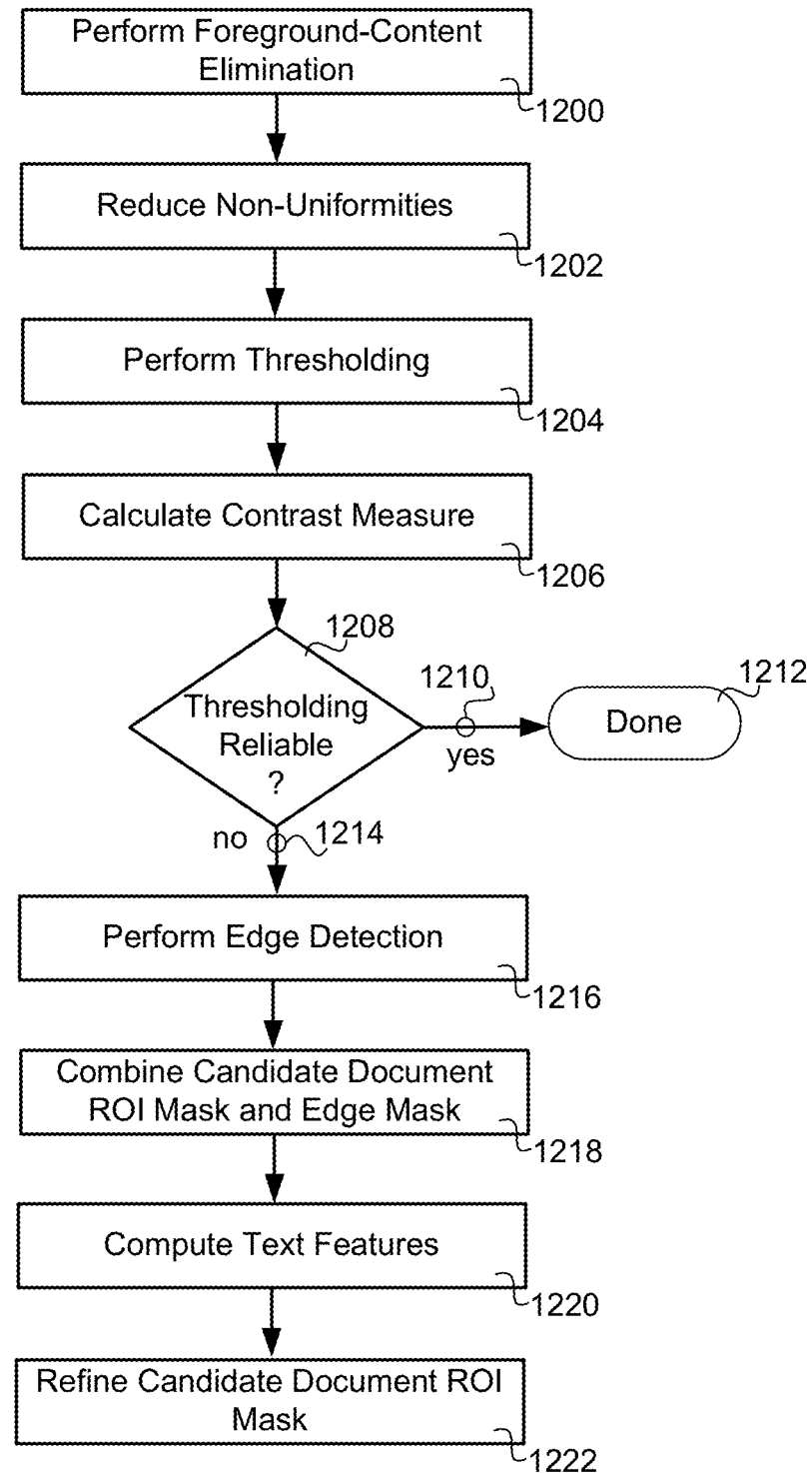

FIG. 9 shows a text-feature image, associated with the exemplary down-sampled luminance image shown in FIG. 2, generated according to embodiments of the present invention FIG. 10 depicts a final document region-of-interest mask generated from the second candidate document region-of-interest mask and the text-feature image shown in FIG. 8 and FIG. 9, respectively, according to embodiments of the present invention;

FIG. 11 depicts the image region associated with the final document region-of-interest mask shown in FIG. 10; and FIG. 12 is a chart shown exemplary embodiments of the present invention comprising thresholding reliability determination.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or a computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

With the proliferation of digital cameras and camera-equipped mobile devices, a user may capture an image of a document, or of an object displaying document-like content, for example, a sign, a whiteboard, a poster, a projected slide and other objects displaying document-like content. The captured image may be provided as input to a traditional, document-processing workflow, for example, printing, optical character recognition (OCR), compression, archival and other document processing workflow processes. However, unlike a document image obtained using a scanner, a camera-captured document image may contain clutter with spurious content in the image background. Furthermore, a camera-captured image may suffer from artifacts related to, for example, non-uniform lighting, glare, optical distortion, perspective distortion and other artifact-generating issues. The elimination of artifacts may rely on the accurate detection and extraction of the document region, also considered the document region-of-interest, in the captured image, and subsequent processing in a document-processing workflow may yield erroneous results when the document region is not accurately determined. Therefore, methods and systems for determining a document region-of-interest in an image may be desirable.

Embodiments of the present invention comprise methods, systems and apparatus for determining a document region-of-interest in a camera-captured, or otherwise non-scan captured, document image, wherein document image may refer to an image of a document or an image of an object displaying document-like content.

Figure 1:
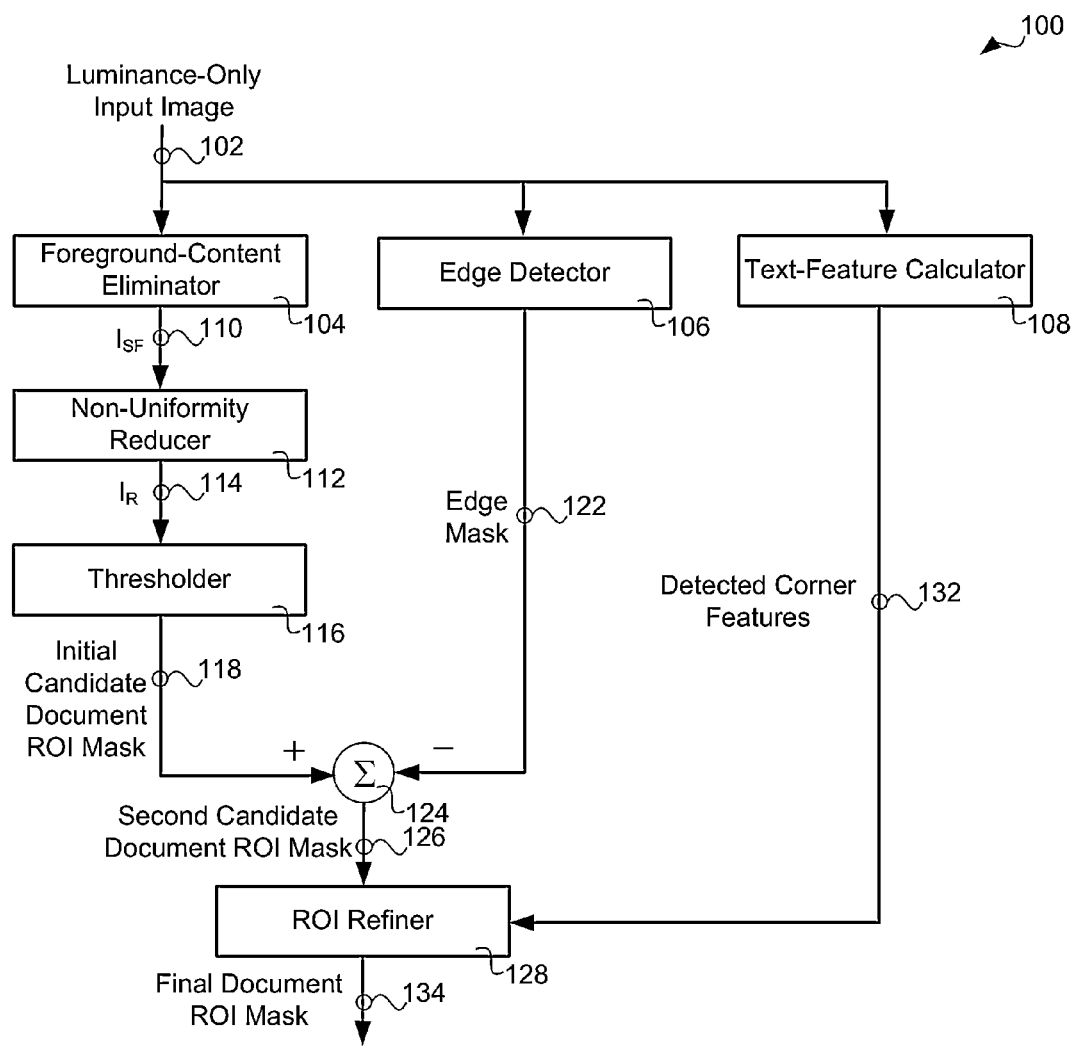
FIG. 1 is a chart showing exemplary embodiments of the present invention comprising refining a candidate document region-of-interest mask based on text features.

Some embodiments may be understood in relation to FIG. 1. A document region-of-interest detection system 100 may receive a luminance-only input image 102, which may be denoted I, corresponding to the luminance component of a document image. In an exemplary embodiment of the present invention, the luminance-only input image 102 may correspond to the Y-channel of a YCbCr image. In alternative embodiments of the present invention, the luminance-only input image 102 may correspond to the L-channel of an La*b* image. In yet alternative embodiments of the present invention, the luminance-only input image 102 may correspond to a gray-scale image.

The luminance-only input image 102 may be made available to a foreground-content eliminator 104 for foreground-content elimination, an edge detector 106 for edge detection and a text-feature calculator 108 for calculating text features. The foreground-content eliminator 104 may process the luminance-only input image 102 to eliminate the foreground content in the luminance-only input image, corresponding to the document image, to obtain a near-uniform background region with minimal edge data content. In one embodiment of the present invention, in the foreground-content eliminator 104, the luminance-only input image, I, may be down-sampled to a low-resolution image, which may be denoted $I_s$. A flood-filling operation may be performed on the low-resolution image, $I_s$, to generate an output image 110, which may be denoted $I_{SF}$, from the foreground-content eliminator 104.

Figure 3:
FIG. 3 depicts a foreground-eliminated image, corresponding to the exemplary down-sampled luminance image depicted in FIG. 2, generated in accordance with embodiments of the present invention.

The flood-filling operation may effectuate the replacement of low gray-level values of text pixels with those gray-level values of surrounding light-colored background pixels, thereby resulting in the generation of a document region with largely uniform gray-level values. In alternative embodiments of the present invention, the foreground-content eliminator 104 may use alternative image processing techniques, for example, dilation, median filtering and other techniques to achieve foreground-content elimination. FIG. 2 shows an exemplary down-sampled image 200, and FIG. 3 shows the resulting image 300, associated with the exemplary down-sampled image 200 of FIG. 2, after foreground-content elimination.

Figure 4:
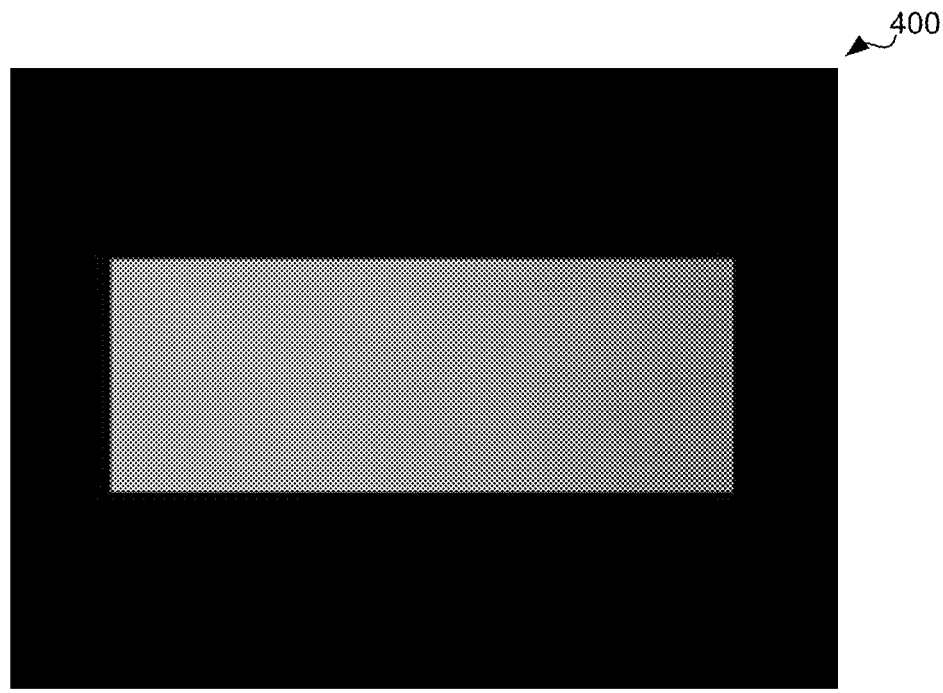
FIG. 4 depicts an exemplary marker image, according to embodiments of the present invention, associated with the foreground-eliminated image depicted in FIG. 3.
Figure 5:
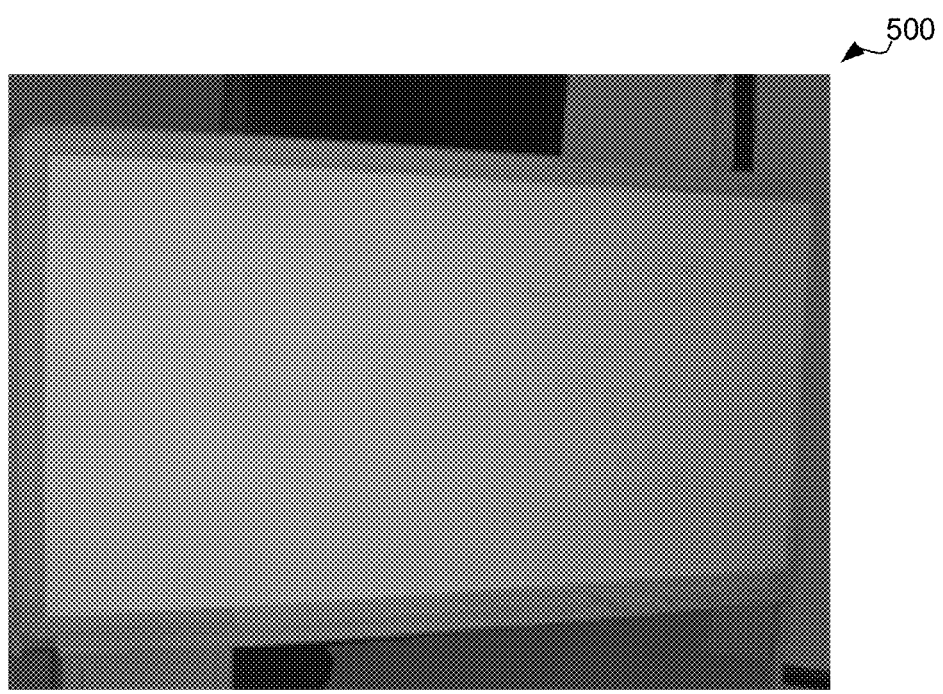
FIG. 5 depicts an image, associated with the foreground-eliminated image shown in FIG. 3, reconstructed according to embodiments of the present invention using the marker image depicted in FIG. 4.

Returning to FIG. 1, the resulting output image, $I_{SF}$, also referred to as a foreground-eliminated image, 110 from the foreground-content eliminator 104 may be made available to a non-uniformity reducer 112. The non-uniformity reducer 112 may reduce non-uniformities and may eliminate glare effects that may be present in the foreground-eliminated image 110. In some embodiments of the present invention, the non-uniformity reducer 112 may perform a morphological reconstruction operation on the foreground-eliminated image 110 to effectuate the dilation, or spreading out, of the peaks found within a central region of the foreground-eliminated image 110. In these exemplary embodiments, a marker image, which may be denoted $I_M$, may be extracted from the foreground-eliminated image, $I_{SF}$, 110, and the marker image, $I_M$, may be used to drive the morphological reconstruction process. The morphological reconstruction operation may process the marker image, $I_M$, based on the characteristics of a mask image. In some embodiments of the present invention, the foreground-eliminated image, $I_{SF}$, 110 may be used as the mask image. The marker image, $I_M$, may be selected in a variety of ways. In one exemplary embodiment, the pixel values in the marker image, $I_M$, may be set to zero, except for in a region of a predetermined size in the center of the marker image, $I_M$. In this region, a pixel in the marker image, $I_M$, may be set to the value of the corresponding pixel in the foreground-eliminated image, $I_{SF}$, 110. Thus, all pixels in the marker image, $I_M$, have a value less than or equal to the value of the corresponding pixel in the mask image. The morphological reconstruction operation may be understood conceptually as successive dilations of the marker image, wherein each, successive dilation is constrained to lie underneath the mask image. The dilation process may be terminated when further dilation does not yield a change in the reconstructed image generated from the previous dilation. A person having ordinary skill in the art will recognize that there are many methods by which morphological reconstruction may be implemented. The final reconstructed image from the morphological reconstruction process may be referred to as the reconstructed image 114 and may be denoted $I_R$. An exemplary marker image 400, associated with the exemplary images of FIGS. 2 and 3, is shown in FIG. 4, and the reconstructed image 500 resulting from a morphological reconstruction operation is shown in FIG. 5.

In some embodiments of the present invention, the relationship between background color and text, foreground color may be examined in the non-uniformity reducer 112. In these embodiments, the mean gray value, which may be denoted $\mu_{I_M}$, of the non-zero pixel values in the marker image may be calculated and compared to the mean gray value, which may be denoted $\mu_{I_M^c}$, of the remaining pixels in the foreground-eliminated image 110, $I_{SF}$. If $\mu_{I_M} > \mu_{I_M^c}$ and $\mu_{I_M} > T_{BG}$, where $T_{BG}$ is a threshold value associated with the distance of the document background luminance from "white," then the document portion of the image is considered to comprise a light-colored background with a darker-colored text in the foreground, and processing may continue. If the condition $\mu_{I_M} > \mu_{I_M^c}$ and $\mu_{I_M} > T_{BG}$ is not met, then, in some embodiments, the processing to determine the document region-of-interest may terminate. In alternative embodiments, when the condition $\mu_{I_M} > \mu_{I_M^c}$ and $\mu_{I_M} > T_{BG}$ is not met, an initial candidate document region-of-interest mask determined from the thresholder 116 may be inverted and processing to determine the document region-of-interest may continue. An exemplary value for $T_{BG}$ is 100.

Figure 6:
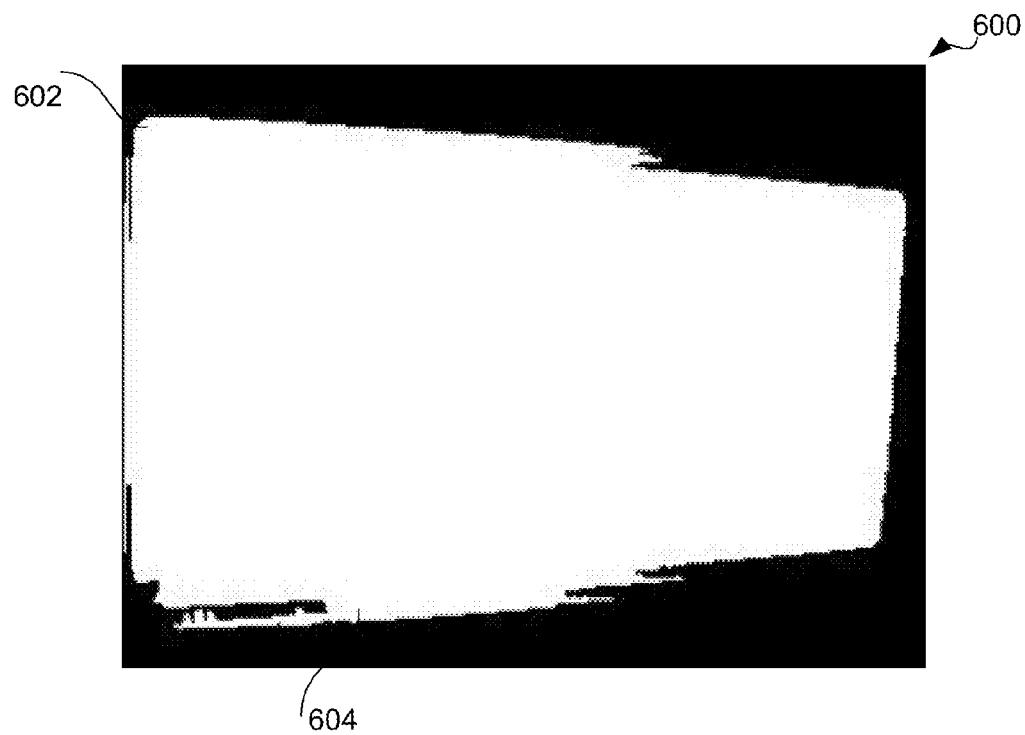
FIG. 6 depicts an initial candidate document region-of-interest mask, associated with the exemplary down-sampled luminance image shown in FIG. 2, generated according to embodiments of the present invention.

The reconstructed image 114 may be made available to a thresholder 116 which may produce a first candidate document region-of-interest mask 118. The thresholder 116 may select a threshold to separate the document region-of-interest from the non-document region. Many methods exist for threshold selection. In an exemplary embodiment of the present invention, the Otsu method for threshold selection described in "A threshold selection method from gray-level histograms," IEEE Transactions on Systems, Man and Cybernetics, volume 9, pages 62-66, 1979, by Nobuyuki Otsu may be used, said cited paper is hereby incorporated by reference herein in its entirety. FIG. 6 shows an exemplary candidate document region-of-interest mask 600 resulting from the thresholder 116 for the exemplary reconstructed image 500 shown in FIG. 5.

As seen in FIG. 6, the results of the thresholder 116 may contain spurious content, for example, the frame 602 of the writing surface and the bottom ledge 604 of the writing surface.

Referring to FIG. 1, an edge mask 122 from the luminance-only input image 102 may be extracted by an edge detector 106 and used to eliminate the spurious content from the candidate document region-of-interest mask 118. In some embodiments of the present invention, the edge detector 106 may operate on a down-sampled image. In alternative embodiments, the edge detector 106 may operate on a full-resolution image. The edge detector 106 may effectuate edge detection using any of the edge-detection methods known in the art, for example, gradient-based methods, zero-crossing methods and other edge-detection methods.

Figure 7:
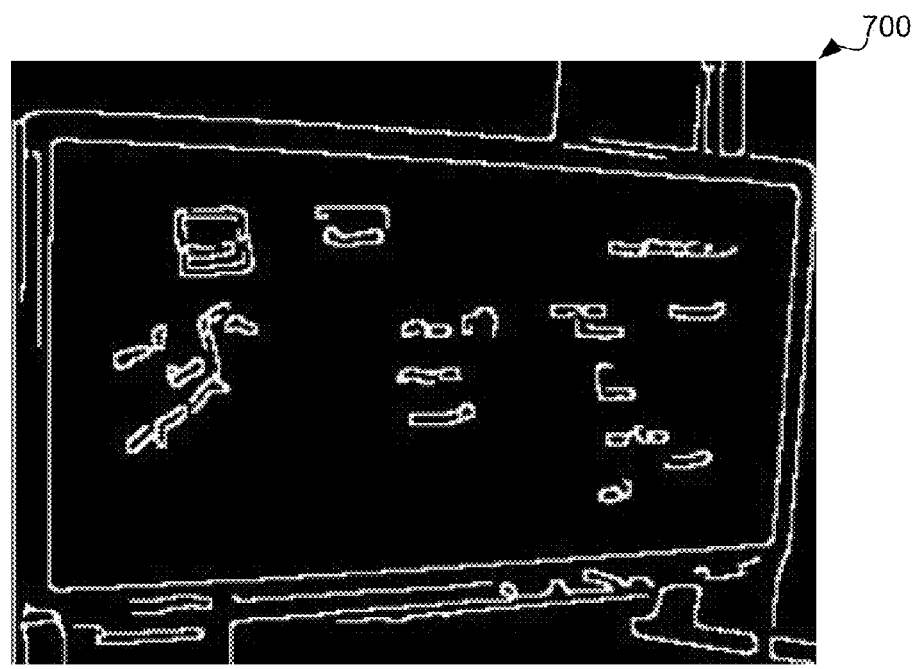
FIG. 7 depicts an edge mask, associated with the exemplary down-sampled luminance image shown in FIG. 2, generated according to embodiments of the present invention.

The edge mask 122 resulting from the edge detector 106 may be combined 124 with the initial, candidate document region-of-interest mask 118 according to:

$$M_{ROI}^{(2)}(x, y) = \begin{cases} 1, & [M_{ROI}^{(1)}(x, y) - M_E(x, y)] > 0 \\ 0, & \text{otherwise,} \end{cases}$$

where $M_{ROI}^{(1)}(x, y)$ denotes the first candidate document region-of-interest mask value at location $(x, y)$, $M_E(x, y)$ denotes the edge mask value at $(x, y)$ and $M_{ROI}^{(2)}(x, y)$ denotes the second candidate document region-of-interest mask value at $(x, y)$. In some embodiments of the present invention, the second candidate document region-of-interest mask may be processed by an image filling algorithm to eliminate holes in the interior of each component. In alternative embodiments, image filling may not be performed. FIG. 7 depicts an exemplary edge mask image 700 associated with the exemplary input image 200 shown in FIG. 2. FIG. 8 depicts the resultant candidate document region-of-interest mask 800 from combining the edge mask image 700 shown in FIG. 7 with the initial, candidate document region-of-interest mask 600 shown in FIG. 6. The writing surface 802 is clearly demarcated from the surrounding areas 804, 806, and the writing surface 802 corresponds to a distinct, connected region.

The second candidate document region-of-interest mask 126 may be further refined by a region-of-interest (ROI) refiner 128. The ROI refiner 128 may identify the connected components in the second candidate document region-of-interest mask 126 and may analyze each component to determine whether or not it corresponds to a portion of the document region-of-interest.

In some embodiments of the present invention, the ROI refiner 128 may determine the amount of text-like content covered by a connected component, which may be denoted $c_i$, in the second document candidate region-of-interest mask 126. In an exemplary embodiment, the ROI refiner 128 may receive, from a text-feature calculator 108, corner features 132 detected in the input luminance-only image 102. In some embodiments of the present invention, the text-feature calculator 108 may comprise a Harris corner detector as described in "A combined corner and edge detector," Proceedings of the 4$^{th}$ Alvey Vision Conference, pages 147-151, 1988, by C. Harris and M. Stephens, said cited paper is hereby incorporated by reference herein in its entirety. FIG. 9 shows an image 900 identifying corner features detected from the exemplary input image 200 of FIG. 2.

In some embodiments of the present invention, the ROI refiner 128 may measure the text coverage provided by a connected component, in the second document candidate region-of-interest mask 126, as the ratio, which may be denoted $c_i$, of the number of corner features that fall within $c_i$, to the total number of corner features. If the value of $r_i$ exceeds a predetermined threshold, which may be denoted $T_r$, then the connected component, $c_i$, may be added to the final document region-of-interest mask 134, which may be denoted $M_{ROI}$, otherwise, the connected component, $c_i$, may be discarded. In some embodiments of the present invention, the value of $T_r$ may be set to 2.5%. FIG. 10 shows an final document region-of-interest mask 1000 generated by the ROI refiner 128, based on text coverage, for the exemplary second candidate document region-of-interest mask 800 shown in FIG. 8 and the exemplary edge mask 700 shown in FIG. 7. For this example, the image data 1100 corresponding to the detected, final document region-of-interest mask 1000 is shown in FIG. 11.

Alternative embodiments of the present invention may be understood in relation to FIG. 12. In these alternative embodiments, foreground-content elimination 1200 may be performed on a luminance-only document image to eliminate the foreground content in the document image to obtain a near-uniform background region with minimal edge data. In one embodiment of the present invention, during foreground-content elimination 1200, the luminance-only image, which may be denoted I, may be down-sampled to a low-resolution image, which may be denoted $I_s$. A flood-filling operation may be performed on the low-resolution image, $I_s$, to generate a low-resolution, filled image, which may be denoted $I_{SF}$. The flood-filling operation may effectuate the replacement of low gray-level values of text pixels with those gray-level values of surrounding light-colored background pixels, thereby resulting in the generation of a document region with largely uniform gray-level values. In alternative embodiments of the present invention, the foreground-content elimination may use alternative image processing techniques, for example, dilation, median filtering and other techniques to achieve foreground-content elimination.

Non-uniformities may be reduced 1202 in the foreground-content eliminated image, also referred to as the foreground-eliminated image. Non-uniformity reduction may reduce non-uniformities and may eliminate glare effects that may be present in the foreground-eliminated image. In some embodiments of the present invention, a morphological reconstruction operation may be performed on the foreground-eliminated image during non-uniformity reduction to effectuate the dilation, or spreading out, of the peaks found within a central region of the foreground-eliminated image. In these exemplary embodiments, a marker image, which may be denoted $I_M$, may be extracted from the foreground-eliminated image, $I_{SF}$, and may be used to drive the morphological reconstruction process. The morphological reconstruction operation may process the marker image based on the characteristics of a mask image. In some embodiments of the present invention, the foreground-eliminated image, $I_{SF}$, may be used as the mask image. The marker image, $I_M$, may be selected in a variety of ways. In one exemplary embodiment, the pixel values in the marker image may be set to zero, except for in a region of predetermined size in the center of the image. In this region, a pixel in the marker image may be set to the value of the corresponding pixel in the foreground-eliminated image, $I_{SF}$. Thus, all pixels in the marker image have a value less than or equal to the value of the corresponding pixel in the mask image. A person having ordinary skill in the art will recognize that there are many methods by which morphological reconstruction may be implemented.

A thresholding operation may be performed 1204 of the reconstructed image to produce a first candidate document region-of-interest mask. The thresholding operation may apply a threshold to separate the document region-of-interest from the non-document region. Many methods exist for threshold selection. In an exemplary embodiment of the present invention, the Otsu method for threshold selection described in "A threshold selection method from gray-level histograms," IEEE Transactions on Systems, Man and Cybernetics, volume 9, pages 62-66, 1979 by Nobuyuki Otsu may be used.

A contrast measure may be calculated 1206 to quantify the quality of the thresholding operation. In some embodiments of the present invention, the contrast measure, which may be denoted $r_\mu$, may be calculated according to:

$$r_\mu = \frac{\mu_{ROI}}{\mu_{ROI^c}},$$

where $\mu_{ROI}$ and $\mu_{ROI^c}$ are the mean gray values of the pixels in the luminance-only input image in the region identified by the first candidate document region-of-interest mask and of the pixels in the remainder of the input luminance-only document image, respectively.

A determination 1208 may be made as to whether, or not, the thresholding is reliable. In some embodiments of the present invention, the thresholding may be deemed reliable when the contrast measure, $r_\mu$, meets a first criterion in relation to a contrast-measure threshold, which may be denoted $T_{r_\mu}$. In some of these embodiments, the thresholding may be considered reliable 1210 when $r_\mu > T_{r_\mu}$. In an exemplary embodiment, the value of $T_{r_\mu}$ may be set to 2.5.

If the thresholding is 1210 considered reliable, then the document region-of-interest determination may terminate 1212, and the first candidate document region-of-interest mask may be considered the final document region-of-interest mask. If the thresholding is not 1214 considered reliable, then edge detection may be performed 1216 on the luminance-only input image.

Edge detection may be performed 1216 using any of the edge detection methods known in the art, for example, gradient-based methods, zero-crossing methods and other edge detection methods. An edge mask resulting from the edge detection 1216 may be combined 1218 with the initial, also considered first, candidate document region-of-interest mask according to:

$$M_{ROI}^{(2)}(x, y) = \begin{cases} 1, & [M_{ROI}^{(1)}(x, y) - M_E(x, y)] > 0 \\ 0, & \text{otherwise,} \end{cases}$$

where $M_{ROI}^{(1)}(x, y)$ denotes the first candidate document region-of-interest mask value at location (x, y), $M_E(x, y)$ denotes the edge mask value at (x, y) and $M_{ROI}^{(2)}(x, y)$ denotes the second candidate region-of-interest mask value at (x, y). In some embodiments of the present invention, the second candidate document region-of-interest mask may be processed by an image filling algorithm to eliminate holes in the interior of each component. In alternative embodiments, image filling may not be performed.

Text features may be computed 1220 for the input, luminance-only image. In some embodiments of the present invention, text features may comprise corner features as detected according to a Harris corner detector described in "A combined corner and edge detector," Proceedings of the 4th Alvey Vision Conference, pages 147-151, 1988 by C. Harris and M. Stephens. The text features may be used to refine 1222 the candidate document region-of-interest mask.

In some embodiments of the present invention, refining 1222 the candidate document region-of-interest mask may comprise determining the amount of text-like content covered by a connected component, which may be denoted $c_i$, in the second, candidate region-of-interest mask. In some embodiments of the present invention, refining 1222 the candidate, document region-of-interest mask may comprise measuring the text coverage provided by a connected component, $c_i$, in the second, candidate region-of-interest mask, as the ratio, which may be denoted $r_i$, of the number of corner features that fall within $c_i$, to the total number of corner features. If the value of $r_i$, exceeds a predetermined threshold, which may be denoted $T_r$, then the connected component, $c_i$, may be added to the final document region-of-interest mask, which may be denoted $M_{ROI}$, otherwise, the connected component, $c_i$, may be discarded. In some embodiments of the present invention, the value of $T_r$ may be set to 2.5%.

In some embodiments of the present invention, the detected, final document region-of-interest mask may be validated by counting the number of distinct connected components in the final document region-of-interest mask. If the number of connected components, which may be denoted $n_C$, in the final document region-of-interest mask exceeds a predetermined threshold, which may be referred to as a connected-component threshold and which may be denoted $T_N$, then the final document region-of-interest mask may be discarded as invalid. In some embodiments of the present invention $T_N$ may be set to six.

In alternative embodiments of the present invention, the determined, final document region-of-interest mask may be validated by determining the percentage of text features contained in the region associated with the final document region-of-interest mask relative to the total number of text features. In some embodiments of the present invention, the final document region-of-interest mask may be discarded as invalid when the percentage of text features contained in the region associated with final document region-of-interest mask relative to the total number of text features meets a first criterion. In some embodiments, the document region-of-interest mask may be discarded as invalid when $P_{txt}^{ROI} < T_{txt}$, where $P_{txt}^{ROI}$ is the percentage of text features contained in the determined document region-of-interest mask relative to the total number of text features, and $T_{txt}$ is a feature-occurrence threshold value. The value of the threshold, $T_{txt}$ may depend on the particular feature(s) used to identify text-like content. In some embodiments of the present invention wherein a Harris corner detector is used to identify text features, the threshold $T_{txt}$ may be set to 50%.

In some embodiments of the present invention, the image region associated with the final document region-of-interest mask may be extracted from the luminance-only image. In alternative embodiments of the present invention, the image region associated with the final document region-of-interest mask may be extracted from the document image from which the luminance-only input image was derived.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining a document region-of-interest from an image, said method comprising, in a computing device:
    eliminating foreground-content in said image, thereby producing a foreground-eliminated image;
    reducing non-uniformities in said foreground-eliminated image, thereby producing a reconstructed image;
    thresholding said reconstructed image, thereby producing a first candidate document region-of-interest mask;
    detecting edges in said image, thereby producing an edge mask;
    combining said first candidate document region-of-interest mask and said edge mask, thereby producing a second candidate document region-of-interest mask;
    and refining said second candidate document region-of-interest mask based on a text-feature calculated from said image, thereby producing a final document region-of-interest mask.

2. A method as described in claim 1, wherein said eliminating foreground-content comprises:
    down-sampling said image to produce a lower-resolution image; and
    performing a flood-filling operation on said lower-resolution image to produce said foreground-eliminated image.

3. A method as described in claim 1, wherein said reducing non-uniformities comprises a morphological reconstruction operation.

4. A method as described in claim 3, wherein:
    said morphological reconstruction operation uses a marker image wherein a first plurality of pixel locations in said marker image are associated with a central region in said foreground-eliminated image and a second plurality of pixel locations in said marker image are associated with a region in said foreground-eliminated image not in said central region;
    a first pixel value for a first pixel located in said first plurality of pixel locations is the same value as said associated pixel location in said foreground-eliminated image; and
    a second pixel value for a second pixel located in said second plurality of pixel locations is zero.

5. A method as described in claim 3, wherein:
    said morphological reconstruction operation uses a mask image; and
    said mask image is said foreground-eliminated image.

6. A method as described in claim 1, wherein said combining said first candidate document region-of-interest mask and said edge mask comprises subtracting said edge mask from said first candidate document region-of-interest mask.

7. A method as described in claim 1, wherein said text feature is a corner feature.

8. A method as described in claim 7, wherein said corner feature is calculated using a Harris corner detector.

9. A method as described in claim 1 further comprising validating said final document region-of-interest mask.

10. A method as described in claim 9, wherein said validating comprises:
    determining a number of connected components comprising said final document region-of interest mask; and
    invalidating said final document region-of-interest mask when said number of connected components meets a first criterion in relation to a connected-component threshold.

11. A method as described in claim 9, wherein said validating comprises:
    calculating a percentage of occurrences of said text feature in a region associated with said final document region-of-interest mask; and
    invalidating said final document region-of-interest mask when said percentage meets a first criterion in relation to a feature-occurrence threshold.

12. A method as described in claim 1 further comprising extracting a document region-of-interest associated with said final document region-of-interest mask.

13. A method as described in claim 1, wherein said image is a luminance-only image.

14. A method as described in claim 1, further comprising:
    calculating a contrast measure; and
    determining the reliability of said thresholding based on said contrast measure.

15. A method as described in claim 14, further comprising, when said thresholding is determined to be reliable:
    skipping said detecting, said combining and said refining; and setting said final document region-of-interest mask to said first candidate document region-of-interest mask.

16. A method as described in claim 15 further comprising extracting a document region-of-interest associated with said final document region-of-interest mask.

17. A system for determining a document region-of-interest from an image, said system comprising, in a computing device:
   a processor; and
   a memory storing a computer program that when executed by the processor causes the processor to act as:
      a foreground-content eliminator for eliminating foreground-content in an image, thereby producing a foreground-eliminated image;
      a non-uniformity reducer for reducing non-uniformities in said foreground-eliminated image, thereby producing a reconstructed image;
      a thresholder for thresholding said reconstructed image, thereby producing a first candidate document region-of-interest mask;
      an edge detector for detecting edges in said image, thereby producing an edge mask;
      a combiner for combining said first candidate document region-of-interest mask and said edge mask, thereby producing a second candidate document region-of-interest mask; and
      a region-of-interest refiner for refining said second candidate document region-of-interest mask based on a text-feature calculated from said image, thereby producing a final document region-of-interest mask.

18. A system as described in claim 17, wherein said foreground-content eliminator comprises:
   a down-sampler for down-sampling said image to produce a lower-resolution image; and
   a flood-filler for performing a flood-filling operation on said lower-resolution image to produce said foreground-eliminated image.

19. A system as described in claim 17, wherein said non-uniformity reducer comprises a morphological reconstructor for performing a morphological reconstruction operation.

20. A system as described in claim 17 wherein the memory further stores code which when executed causes the processor to act as a region-of-interest extractor for extracting a document region-of-interest associated with said final document region-of-interest mask.

21. A system as described in claim 17 wherein the memory further stores code which when executed causes the processor to act as a region-of-interest validator for validating said final document region-of-interest mask.

22. A system as described in claim 21, wherein said region-of-interest validator comprises:
   a connected-components counter for determining a number of connected components comprising said final document region-of interest mask; and
   an invalidator for invalidating said final document region-of-interest mask when said number of connected components meets a first criterion in relation to a connected-component threshold.

23. A system as described in claim 21, wherein said region-of-interest validator comprises:
   a text-feature occurrence calculator for calculating a percentage of occurrences of said text feature in a region associated with said final document region-of-interest mask; and
   and invalidator for invalidating said final document region-of-interest mask when said percentage meets a first criterion in relation to a feature-occurrence threshold.

* * * * *